Patented Aug. 27, 1946

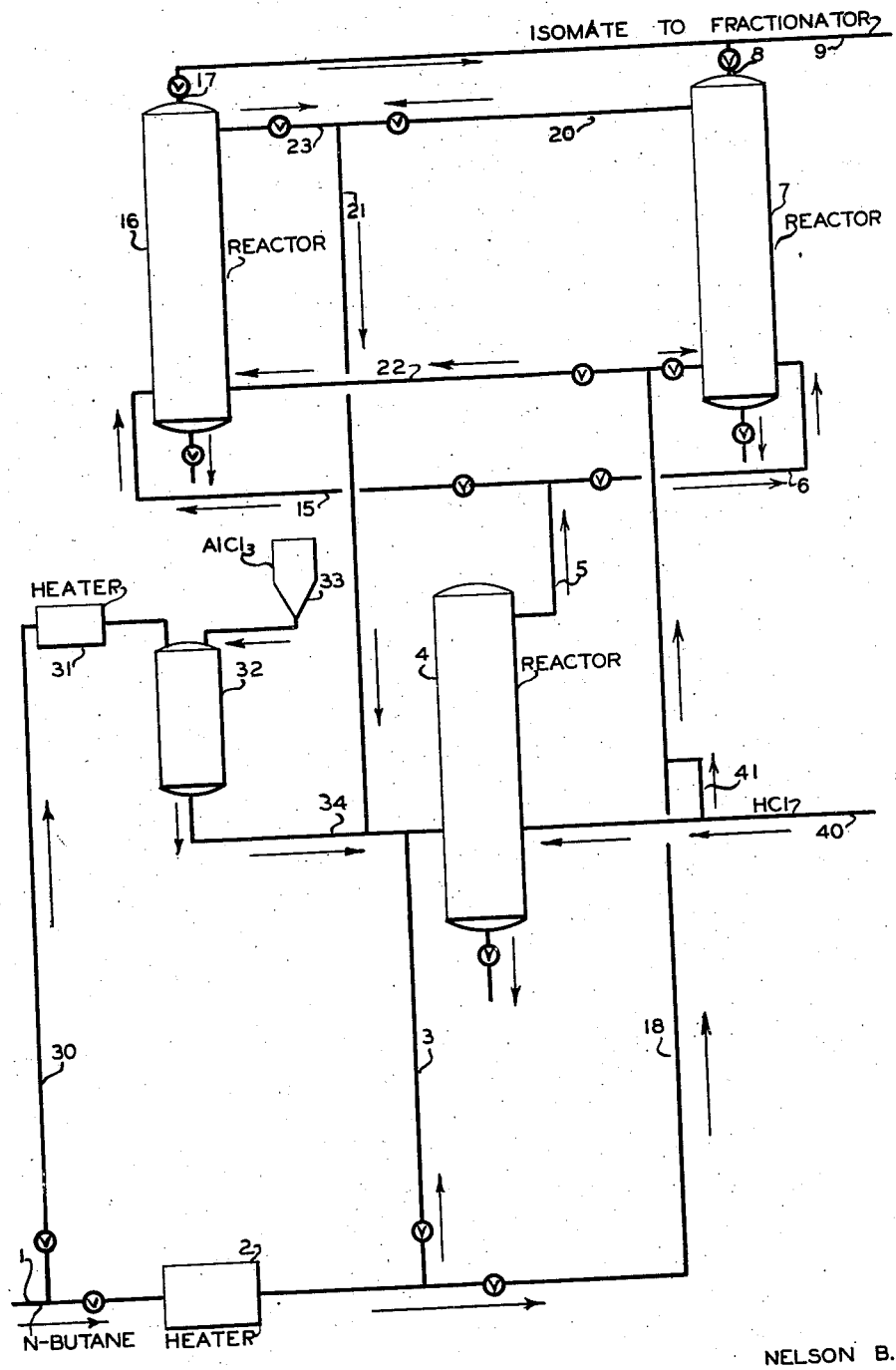

2,406,681

UNITED STATES PATENT OFFICE 2,406,681

CATALYTIC CONVERSION OF HYDROCARBONS

Nelson B. Haskell, Port Arthur, Tex., assignor to The Texas Company, New York, N. Y., a corporation of Delaware Application June 25, 1943, Serial No. 492,210

6 Claims. (Cl. 260—683.5)

This invention relates to a continuous process for effecting catalytic conversions of hydrocarbons such as isomerization of saturated hydrocarbons.

The invention has to do with the catalytic conversion of hydrocarbons by the action of a conversion catalyst comprising metallic halide-hydrocarbon complex. It involves effecting the reaction during passage of the hydrocarbons undergoing treatment through a plurality of separate reaction zones, each zone containing complex catalyst liquid containing a different concentration of metallic halide.

In accordance with the invention a stream of feed hydrocarbons is subjected to contact under conversion conditions with a liquid catalyst which comprises metallic halide-hydrocarbon complex having a relatively high content of metallic halide. Thereafter the hydrocarbon products containing some metallic halide in solution are subjected to contact with complex liquid having a relatively low content of metallic halide and capable of removing the dissolved metallic halide from the hydrocarbon products so that the hydrocarbon products are discharged from the final reaction zone of the process substantially free from metallic halide. The complex liquid used for making this final contact with hydrocarbon products of reaction becomes enriched in metallic halide and is used in a separate zone for treating a separate stream of fresh feed hydrocarbons under conditions such that at least partial conversion is effected. The hydrocarbon products of reaction from this separate reaction zone are passed to the first-mentioned reaction zone containing catalyst of relatively high metallic halide content.

In this separate reaction zone the metallic halide content of the complex liquid is reduced thereby forming a relatively lean complex which may be used for effecting removal of dissolved metallic halide from the hydrocarbon products in the final reaction zone.

Also in accordance with the invention a separate stream of feed hydrocarbons may be passed directly to the main reaction zone containing the complex catalyst of relatively high metallic halide content and make-up metallic halide may be dissolved in this separate stream of feed hydrocarbons so as to compensate at least in part for metallic halide disappearance from the system and particularly from the main reaction zone wherein it is desired to maintain a relatively high concentration of metallic halide.

The invention has particular application in the isomerization of saturated hydrocarbons with an aluminum halide catalyst such as aluminum chloride. Thus in carrying out the process as applied to the isomerization of hydrocarbons with an aluminum chloride catalyst it is contemplated employing in the main reaction zone a catalyst consisting essentially of aluminum chloride-hydrocarbon complex liquid characterized by having a heat of hydrolysis of about 350 calories or more per gram of complex liquid or having a heat of hydrolysis substantially above about 320 to 330 calories per gram of complex liquid. Such complex liquid will contain free aluminum chloride which may be present as a solution in the complex liquid or may be suspended therein as undissolved solid aluminum chloride. It may be present in both dissolved and suspended form. The catalyst may consist of molecularly dispersed aluminum chloride in a complex formed by the reaction of aluminum chloride with an aliphatic hydrocarbon.

The stream of hydrocarbon products issuing from this main reaction zone will contain a substantial amount of dissolved aluminum chloride. This stream is then passed through another reaction zone wherein it is subjected to contact with complex liquid which is relatively lean in free aluminum chloride, being characterized, for example, by having a heat of hydrolysis of not more than about 260 calories per gram of complex liquid or substantially below about 320 to 330. As a result of this contact the lean complex becomes enriched with aluminum chloride which it has removed from the hydrocarbons undergoing treatment and the treated hydrocarbons may be discharged free or substantially free from aluminum chloride.

Contact between the hydrocarbon products and complex liquid of relatively low aluminum chloride content is continued until the complex liquid has become enriched and is characterized by having a heat of hydrolysis in the range about 300 to 320 calories per gram. Thereafter the enriched complex is removed from further contact with hydrocarbon products of reaction and is used for treating another and separate stream of feed hydrocarbons. This separate stream is subjected to contact with the enriched complex under isomerizing conditions so that at least partial isomerization of the hydrocarbons is effected and is accompanied by a progressive decrease in the aluminum chloride concentration of the complex. When the aluminum chloride content has been decreased so that the complex liquid is characterized by having a heat of hydrolysis of not more than about 260 calories per gram of complex it is removed from further contact with fresh feed hydrocarbons and is then used all or in part for contact with hydrocarbon products in the final reaction zone.

In each of the foregoing operations contact between hydrocarbons and complex of different aluminum chloride concentration is advantageously effected in the presence of a promoter such as hydrogen chloride and under temperature conditions such that isomerization constitutes the principal reaction.

An important advantage of the process has to do with the employment in at least one stage of the process of a complex liquid catalyst which contains free metallic halide in substantial amount and beyond that required for forming the complex compounds.

It has been found that a complex liquid catalyst containing free metallic halide is effective in producing a high rate of conversion. At the same time, however, there is an appreciable amount of metallic halide migration from the reaction zone, the metallic halide being dissolved in the effluent hydrocarbon stream and thus being carried out of the reaction zone. The disappearance of metallic halide from the reaction zone is undesirable from the standpoint of maintaining a uniformly high level of conversion. The presence of the dissolved aluminum halide in the effluent hydrocarbon stream results in accumulation or precipitation of the metallic halide in subsequent stages of the process unless provision is made for effecting its removal.

Therefore, in accordance with the present invention the effluent hydrocarbon stream is subjected to intimate contact with complex liquid which is relatively lean in free metallic halide. It has been found that this lean complex liquid exerts preferential solvent action for the metallic halide and thereby effects its removal from the hydrocarbon products in which the metallic halide may be present as a solute. In this way the lean complex liquid is enriched and the resulting enriched complex may then be utilized in effecting catalytic conversion of at least a portion of the fresh feed hydrocarbons.

It has been found that an aluminum chloride-hydrocarbon complex liquid characterized by having a heat of hydrolysis in the range about 200 to 260 calories per gram of complex liquid is capable of effecting removal of aluminum halide from solution in hydrocarbons and will continue to exert this effect until it is characterized by having a heat of hydrolysis in the range about 300 to 320 calories per gram. As soon as the heat of hydrolysis reaches a substantially higher value aluminum halide is given up and is extracted therefrom by the hydrocarbons with which the complex is brought into contact.

In order to describe the process of the invention in more detail reference will now be made to the accompanying drawing comprising a diagram of flow illustrating one method of practicing the invention as applied to the isomerization of normal butane with an aluminum chloride catalyst promoted with hydrogen chloride.

Referring to the drawing normal butane is conducted from a source not shown through a pipe 1 and passed through a heater 2 wherein it is heated to a temperature of about 200° F. or to a temperature within the range 160 to 240° F. A portion of the heated stream is diverted through a branch pipe 3 and introduced to the lower portion of a main reaction tower 4. In the reactor 4 it is subjected to contact with aluminum chloride-hydrocarbon complex liquid catalyst characterized by having a heat of hydrolysis in the range about 330 to 350 calories per gram of catalyst liquid. Contact between the heated hydrocarbons and the catalyst liquid is effected in the presence of hydrogen chloride under conditions such that isomerization constitutes the principal reaction. The converted and unconverted hydrocarbons are continuously discharged from the upper portion of the reactor 4 through a pipe 5 and the discharged hydrocarbons will contain a small amount of dissolved aluminum chloride, for example, about 0.01 to 0.20% by weight. The discharged hydrocarbons are conducted through a branch pipe 6 to the lower portion of a final reactor 7. In this final reactor the hydrocarbons are subjected to contact with aluminum chloride-hydrocarbon complex liquid having a heat of hydrolysis not in excess of about 300 to 320 calories per gram of complex and preferably having a heat of hydrolysis substantially below this, as, for example, about 260 calories, or in the range of about 200 to 300 calories per gram. The contact is also effected in the presence of promoter at a temperature corresponding approximately to that prevailing in the reactor 4.

The isomerization reaction being slightly exothermic the hydrocarbon stream leaving the reactor 4 will be at an elevated temperature which may be sufficient to maintain the desired temperature in the reactor 7. However, it is contemplated that a different temperature may be maintained in the reactor 7 either below or above that prevailing in the reactor 4.

A stream of hydrocarbons comprising isomerized hydrocarbons and substantially free from aluminum halide is continuously drawn off from the upper portion of the reactor 7 through a pipe 8 communicating with a discharge pipe 9 which advantageously communicates with suitable fractionating equipment wherein isomerized hydrocarbons may be fractionated from unreacted hydrocarbons to permit segregation of the unreacted hydrocarbons for recycling through the system if desired.

The flow of converted hydrocarbon products through the reactor 7 is continued until the complex catalyst liquid therein has become enriched with aluminum chloride to the extent that it is characterized by having a heat of hydrolysis of about 300 to 320 calories per gram of complex. Thereafter the hydrocarbon product stream from the reactor 4 is diverted from the reactor 7 and instead passed through a branch pipe 15 leading to a reactor 16. In other words the direction of flow is reversed before the complex in the reactor 7 becomes saturated with aluminum chloride so that it fails to remove it entirely from the hydrocarbons passing therethrough.

In the reactor 16 the hydrocarbon stream is brought into contact with complex liquid of low aluminum chloride content such as initially used in the reactor 7. The effluent stream of hydrocarbons from the reactor 16 free from aluminum halide is drawn off through a pipe 17 which communicates with the previously mentioned pipe 9.

When the product stream has been diverted from the reactor 7 a separate stream of heated butane feed is conducted from the heater 2 through a pipe 18 leading to the lower portion of the reactor 7. Since the complex retained in the reactor 7 has been enriched with aluminum chloride it is relatively active as an isomerization catalyst so that butane feed passing therethrough in the presence of promoter undergoes isomerization to a substantial extent. During this operation the stream of hydrocarbons leaving the top of the reactor 7 comprising isobutane, normal butane and any aluminum chloride that may be dissolved therein is continuously drawn off through a pipe 20 communicating with a pipe 21 through which it is returned to the lower portion of the reactor 4 wherein it is subjected to further treatment in the presence of the fresh feed butane entering through the pipe 3.

The flow of feed butane through the reactor 7 is continued until the aluminum chloride content of the complex therein has become diminished so that the heat of hydrolysis of the complex is reduced to about 260 calories per gram or lower. Thereupon the flow of hydrocarbons through the reactors 7 and 16 is reversed.

During the time that the reactor 7 is being used as a final stage reaction zone the separate stream of feed butane flowing through the pipe 18 is conducted through a branch pipe 22 leading to the lower portion of the reactor 16. During passage of the heated feed butane through the reactor 16 the enriched complex now present therein undergoes a decrease in its aluminum chloride content. The outlet stream of hydrocarbons from the vessel 16 during this period is drawn off through a pipe 23 which communicates with the pipe 21 previously mentioned.

Another separate stream of normal butane feed is passed through a pipe 30 to a heater or heat exchanger 31 and from there passed to a solution vessel 32. The solution vessel 32 is filled with granular or lump aluminum chloride which may be introduced to the vessel from a hopper 33.

During passage of the butane stream through the vessel 32 solution of aluminum chloride in the butane occurs. The resulting solution is conducted through a pipe 34 to the lower portion of the reactor 4.

The proportion of butane feed diverted through the vessel 32 and the temperature to which it is heated prior to passage therethrough will depend upon the amount of aluminum chloride which it is desired to introduce to the reactor 4. As previously intimated it is contemplated maintaining the liquid catalyst within the reactor 4 at a relatively high level of activity. Since there is some disappearance or migration of aluminum halide from the reactor 4, it is necessary, therefore, to add make-up aluminum halide to compensate for this catalyst disappearance.

Advantageously sufficient aluminum halide is added so that the body of liquid catalyst within the reactor 4 will have a heat of hydrolysis ranging from 330 to 350 calories per gram of catalyst liquid.

The amount of normal butane diverted through the vessel 32 may amount to about 10 to 15% by volume of the total butane charged to the process and the solution temperature prevailing in the vessel 32 may range from room temperature to 150° F. or to a temperature approximating that prevailing within the reaction vessel 4.

The proportion of normal butane feed passed directly through the pipe 3 to the reaction vessel 4 may range from about 0 to 50% by volume of the total butane charged to the process.

The hydrogen chloride promoter is drawn from a source not shown through a pipe 40 and in part conducted directly to the reactor 4 while the remainder is conducted through a branch pipe 41 communicating with the previously mentioned pipe 18 by which means the promoter is introduced to either or both vessels 7 or 16. While promoter may be used simultaneously in the three vessels 4, 7 and 16, it is preferred to inject it to either of the vessels 7 and 16 only during the period that such vessels are employed for effecting contact between fresh feed butane and enriched complex.

It is advantageous when employing an aluminum halide-hydrocarbon complex type of catalyst to provide for separate injection of promoter and make-up aluminum halide to the reaction vessel 4, that is, when adding the hydrogen chloride and aluminum halide in solution in feed hydrocarbons it is contemplated employing separate streams of feed hydrocarbon for this purpose and separately injecting them into the reaction vessel 4.

In the preferred mode of operation the reaction vessels comprise unpacked vertical towers containing a stationary column of complex liquid catalyst, the height of the liquid column ranging from about 10 to 60 feet and preferably being about 25 to 40 feet in height. The feed hydrocarbons are introduced to the lower portion of the liquid column in dispersed liquid phase and caused to rise in dispersed phase through the stationary column of complex by difference in gravity and without subjecting the catalyst liquid to mechanical stirring.

While the use of non-stirred and non-packed towers is mentioned, nevertheless the method of operation is applicable with packed reaction towers, or with mechanically agitated reactors.

Complex liquid catalyst may be initially prepared by reacting aluminum chloride with an aliphatic hydrocarbon in the presence of hydrogen chloride at temperatures in the range 100 to 300° F. for example. An effective preformed complex may be prepared by reacting aluminum chloride with straight run kerosene which is substantially free from olefinic and aromatic constituents, the reaction being effected in the presence of hydrogen chloride at a temperature of about 200 to 250° F.

It is contemplated that some complex is formed in situ during the course of the conversion reaction which accounts for some of the catalyst disappearance and accordingly the active catalyst employed in the process may actually comprise catalyst formed in situ, or a mixture of such catalyst with preformed catalyst.

While aluminum chloride has been mentioned in preparing the complex catalyst it is contemplated that other metallic halides including aluminum bromide may be employed. Likewise the promoter used in preparing the complex or in effecting the conversion reaction may comprise other hydrogen halides besides hydrogen chloride.

The conversion reaction may be carried out in the presence of other agents such as hydrogen and normally gaseous saturated hydrocarbons. It may also be carried out in the presence of inhibiting agents which are useful in suppressing undesired side reactions such as cracking and catalyst deterioration. Such inhibitors include naphthene hydrocarbons such as cyclohexane. In some cases a low boiling aromatic hydrocarbon such as benzene in small amount may be useful in suppressing or inhibiting cracking and catalyst deterioration.

Isomerization of hydrocarbons other than normal butane may be carried out by means of the process described. For example, other hydrocarbons which may be isomerized comprise pentane, hexane, heptane, mixtures thereof and also fractions of naphtha which are substantially free from olefinic and benzenoid or aromatic hydrocarbons.

It is contemplated also that the procedure described may have application in effecting other conversion reactions besides isomerization, wherein a metallic halide-hydrocarbon complex type of catalyst is used at temperatures ranging from normal room temperature to about 300° F.

Mention has been made of isomerizing normal butane in the liquid phase. However, it is contemplated that the conversion reaction may be effected with hydrocarbons undergoing treatment in either the gas or liquid phase, or in mixed phase.

The amount of promoter employed may range from 0.1 to 5% or more by weight of the feed hydrocarbons charged to the process.

In connection with the method of flow specifically illustrated in the drawing it is contemplated that instead of reversing the hydrocarbon flow through the reaction vessels 7 and 16, the vessels may be arranged for continuous flow in one direction therethrough with provision for transferring the complex liquid from one to the other. In this way the final contact between hydrocarbon products and lean complex liquid is continuously made in the same reaction zone.

Obviously many modifications and variations of the invention, as hereinbefore set forth, may be made without departing from the spirit and scope thereof, and, therefore, only such limitations should be imposed as are indicated in the appended claims.

I claim:

1. In a continuous process for isomerizing normal butane the steps comprising passing a stream of normal butane in liquid phase through a primary reaction zone, subjecting said butane in liquid phase to contact therein with a liquid catalyst consisting essentially of aluminum chloride-hydrocarbon complex and aluminum chloride, said catalyst having a heat of hydrolysis of about 330 to 350 calories per gram of catalyst, effecting said contact in the presence of hydrogen halide at a predetermined temperature in the range of about 160 to 240° F. such that isomerization constitutes the principal reaction, passing a stream containing isomerized hydrocarbons and dissolved aluminum chloride from said primary zone through a secondary zone, subjecting the hydrocarbons in the secondary zone to contact in liquid phase with liquid aluminum chloride-hydrocarbon complex having a heat of hydrolysis of about 260 to 300 calories per gram of catalyst, effecting said secondary contact in the presence of hydrogen halide at a temperature in the aforesaid range such that extraction of aluminum chloride from the entering hydrocarbon stream occurs, removing from said secondary reaction zone a stream of treated hydrocarbons substantially free from dissolved aluminum chloride, and producing as a result of said secondary contact a complex catalyst liquid enriched with aluminum chloride, separately subjecting another stream of normal butane to contact with said enriched complex under conditions such that isomerization constitutes the principal reaction and such that said enriched complex becomes denuded of aluminum chloride, and passing said separately treated hydrocarbons to said primary zone.

2. The process according to claim 1 in which a small amount of make-up aluminum chloride is continuously introduced to said primary reaction zone.

3. A continuous isomerization process comprising passing a paraffin hydrocarbon feed comprising normal butane in liquid phase through a primary reaction zone, subjecting said feed in liquid phase to contact therein with a liquid isomerization catalyst consisting essentially of aluminum halide-hydrocarbon complex and aluminum halide, said catalyst having a heat of hydrolysis in excess of about 320 calories per gram of catalyst, effecting said contact in the presence of hydrogen halide at a predetermined temperature in the range of about 100 to 300° F. such that isomerization constitutes the principal reaction, passing a stream containing isomerized hydrocarbons and dissolved aluminum halide from said primary zone through a secondary zone, subjecting the hydrocarbons in the secondary zone to contact in liquid phase with liquid aluminum halide-hydrocarbon complex having a heat of hydrolysis of about 260 to 300 calories per gram of catalyst, effecting said secondary contact in the presence of hydrogen halide at a temperature in the aforesaid range such that extraction of aluminum halide from the entering hydrocarbon stream occurs, removing from said secondary reaction zone a stream of treated hydrocarbons substantially free from dissolved aluminum halide and producing as a result of said secondary contact a complex catalyst liquid enriched with aluminum halide, separately subjecting another stream of said feed hydrocarbons to contact with said enriched complex under conditions such that isomerization constitutes the principal reaction and such that said enriched complex becomes denuded of aluminum halide, and passing said separately treated hydrocarbons to said primary zone.

4. The process according to claim 3 in which a small amount of make-up aluminum halide is continuously introduced to said primary reaction zone.

5. A continuous isomerization process comprising passing a paraffin hydrocarbon feed comprising normal butane in liquid phase through a primary reaction zone, subjecting said feed in liquid phase to contact therein with a liquid isomerization catalyst consisting essentially of aluminum chloride-hydrocarbon complex and aluminum chloride, said catalyst having a heat of hydrolysis of about 330 to 350 calories per gram of catalyst, effecting said contact in the presence of hydrogen halide at a predetermined temperature in the range of about 100 to 300° F. such that isomerization constitutes the principal reaction, passing a stream containing isomerized hydrocarbons and dissolved aluminum chloride from said primary zone through a secondary zone, subjecting the hydrocarbons in the secondary zone to contact in liquid phase with liquid aluminum chloride-hydrocarbon complex having a heat of hydrolysis of about 260 to 300 calories per gram of catalyst, effecting said secondary contact in the presence of hydrogen halide at a temperature in the aforesaid range such that extraction of aluminum chloride from the entering hydrocarbon stream occurs, removing from said secondary reaction zone a stream of treated hydrocarbons substantially free from dissolved aluminum chloride, and producing as a result of said secondary contact a complex catalyst liquid enriched with aluminum chloride, separately subjecting another stream of said feed hydrocarbons to contact with said enriched complex under conditions such that isomerization constitutes the principal reaction and such that said enriched complex becomes denuded of aluminum chloride, and passing said separately treated hydrocarbons to said primary zone.

6. The process according to claim 5 in which a small amount of make-up aluminum chloride is continuously introduced to said primary reaction zone.

NELSON B. HASKELL.